(12) United States Patent
Meierbachtol

(10) Patent No.: US 6,275,182 B1
(45) Date of Patent: Aug. 14, 2001

(54) RADOME POLARIZATION ERROR COMPENSATION

(75) Inventor: Calvin J. Meierbachtol, El Cajon, CA (US)

(73) Assignee: General Dynamics Corporation/Electronics, San Diego, CA (US)

( * ) Notice: Subject to any disclaimer, the term of this patent is extended or adjusted under 35 U.S.C. 154(b) by 0 days.

(21) Appl. No.: 06/161,002

(22) Filed: Jun. 19, 1980

(51) Int. Cl.[7] ........................................................ G01S 7/40
(52) U.S. Cl. .............................. 342/174; 342/62; 342/77; 342/90; 342/97; 342/99; 342/141; 343/872
(58) Field of Search ........................... 343/872, 7.4, 17.7; 342/62, 74, 75, 77, 80–85, 90, 95, 97, 99, 100, 101, 139–141, 153, 159, 162, 174

(56) References Cited

U.S. PATENT DOCUMENTS 3,314,070 * 4/1967 Youngren .......................... 343/872 X
3,316,549 * 4/1967 Wallendorff ....................... 343/872 X
3,940,767 * 2/1976 De Lano et al. .................. 343/872 X
6,114,984 * 9/2000 McNiff ..................................... 342/62

* cited by examiner

Primary Examiner—John B. Sotomayor
(74) Attorney, Agent, or Firm—Brown Martin Haller & McClain, LLP

(57) ABSTRACT

Disclosed is a method and apparatus for improving airborne vehicle tracking and guidance systems by reducing boresight error induced by polarization of the RF energy impinging on the vehicle radome. The radome wall is formed with a taper which gradually increases from the base near the vehicle antenna to the tip according to a disclosed formula which accounts for frequency, incidence angle, look angle, and the dielectric constant of the radome material. This taper of the radome minimizes the crossplane boresight error component magnitude which is polarization sensitive and produces a polarization insensitive inplane boresight error component.

Also disclosed is a method of electronically compensating such radomes for boresight error where the radome boresight error data accumulated during testing is digitized and processed for compensating data in the vehicle electronic system to provide compensated tracking data for the vehicle guidance system.

5 Claims, 3 Drawing Sheets

PRIOR ART - DEFINITION

—— -45° CROSS POLARIZATION
---- +45° CROSS POLARIZATION

——— -45° CROSS POLARIZATION
----- +45° CROSS POLARIZATION

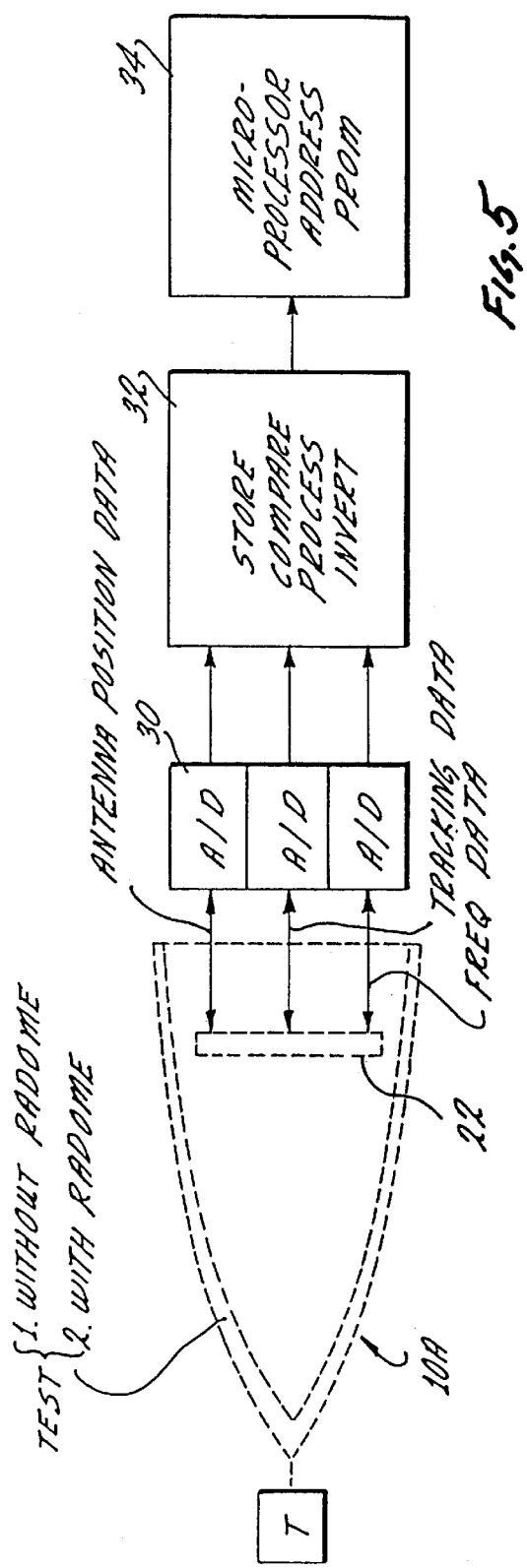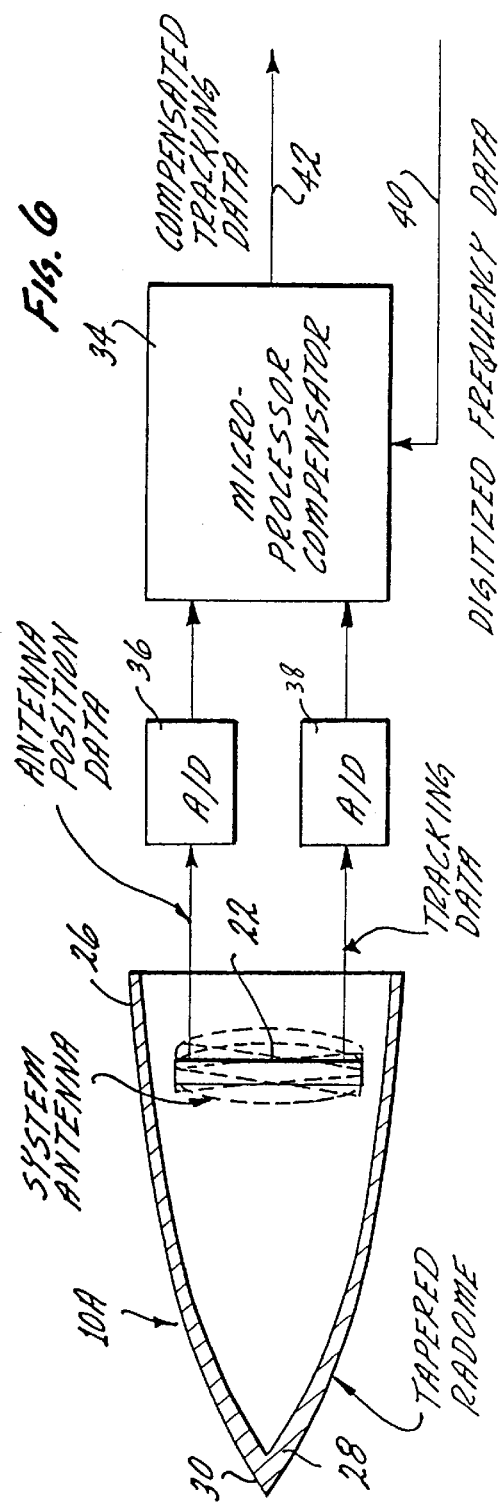

RADOME POLARIZATION ERROR COMPENSATION

BACKGROUND OF THE INVENTION

This invention relates, in general, to air-borne vehicle tracking and guidance systems and is directed, in particular, to improving the directional accuracy of such systems by improving the electrical performance of radomes used in such systems.

Airborne vehicles, such as guided missiles, aircraft and the like, have their electronic equipment covered by a radome of dielectric material which provides mechanical protection for the equipment and contributes to the streamlining of the vehicle. Typically, the antenna system for transmitting and receiving RF energy is mounted (gimbaled) in the radome itself and is actuated to provide mechanical scanning by rotating (oscillating) over measured azimuth and elevation angles relative to the vehicle axis, i.e., its direction of travel. This angle is called look angle. The direction of travel of the vehicle in response to the target information received by the antenna through the radome relative to true target location is called boresight error.

Boresight error is introduced into the tracking system due to the radome shape, material, frequency of operation and the polarization of the RF energy being received or transmitted by the antenna within the radome. The radome electrical performance is sensitive to the polarization of RF energy impinging thereon and is a major detrimental characteristic of the radome. Radome boresight error can be represented by a vector which in turn is resolved into two components for analysis and test purposes as shown in FIG. 1 which shows an outline of a typical existing streamlined radome 10.

The two components of boresight error are identified as inplane 12 and crossplane errors 14. The inplane error 12 is in the plane of rotation of the antenna center line 16 within the radome and crossplane error 14 is perpendicular to the inplane error as shown in this Figure. The magnitude of these errors vary as a function of radome roll, look angle, frequency, and polarization. Components of radome error are generally today reduced by the use of lenses, wall thickness variations, inductive plates, etc. and the performance characteristics of a typical stream-lined missile radome, such as shown as in FIG. 1, are shown in the graphs, FIGS. 2a and 2b.

In these figures, inplane error 12 and crossplane error 14 are plotted in the Y axis direction with the look angle Plotted in the X axis. The solid curved lines and the dashed lines show a 120° swing of the antenna or 120° look angle. The solid curve is for −45° cross polarization and the +45° is the dashed line.

It can be seen from these figures that crossplane data changes significantly with RF energy polarization while the inplane data is nearly polarization insensitive. The crossplane error polarization delta at a given radome look angel can result in a 2° error that changes at the rate of the varying polarization. This large an error can be detrimental to a tracking system accuracy and reliability.

From the foregoing it can be seen that a primary object of this invention is to reduce boresight error as a result of the polarization of RF energy being received or transmitted by the antenna within the radome and thus improve the directional accuracy of tracking and guidance systems.

SUMMARY OF THE INVENTION

The invention which accomplishes the foregoing objects comprises tapering the wall of an air-borne vehicle radome to reduce boresight error caused by polarization of the RF energy inpinging on the vehicle radome. The radome wall taper gradually increases in thickness from a narrow portion at the base near the vehicle antenna to the radome tip according to a formula which accounts for wave length, incidence angle, look angle and the dielectric constant of the material. The taper of the radome reduces the crossplane error to a minimum and since the inplane error is parametric and predictable, it is subject to being reduced to acceptable levels by electronic compensation. In the method of testing such radomes for boresight error, the data is accumulated by first testing the system without a radome and then testing the system with a radome to determine radome boresight error. The boresight error is then processed to generate compensating data which has equal but opposite characteristics to the radome boresight error. This data is digitally stored in the vehicle electronic system (microprocessor) and used to provide compensation to the tracking and guidance data for the vehicle.

BRIEF DESCRIPTION OF THE DRAWINGS

FIG. 5 is a block flow diagram of the procedure for testing and formatting the boresight error data, and FIG. 6 is a block diagram of a typical tapered wall boresight error compensation system coupled into the airborne vehicle electronic guidance system.

DETAILED DESCRIPTION OF THE INVENTION

Figure 1:
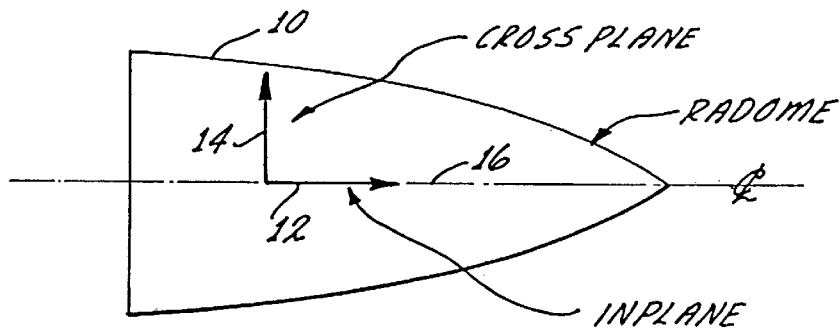
FIG. 1 is an outline of a radome to illustrate the components of boresight error introduced by a typical streamlined radome.
Figure 2A:
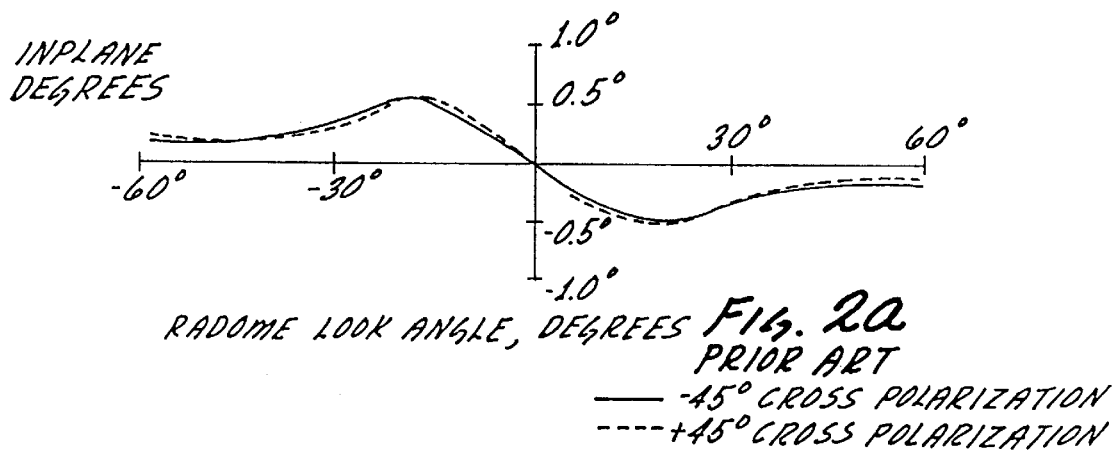
FIGS. 2a and 2b are a graph of the performance characteristics (boresight error) of a typical streamline missile radome such as shown in FIG. 1 with FIGS. 2a showing the inplane error and FIG. 2b showing the crossplane error.
Figure 2B:
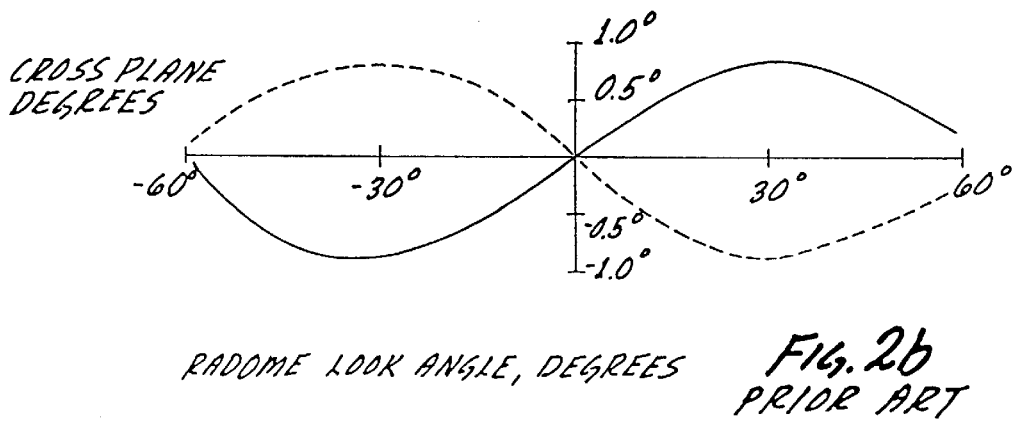

Again, FIGS. 1, 2a and 2b illustrate the existing radome 10 as discussed above with boresight error which can be resolved in two components inplane error 12 and crossplane error 14 and showing that the crossplane error changes significantly with RF energy polarization while the inplane component is nearly polarization insensitive. In the given radome look angle, the crossplane error polarization delta can result in large errors (2°) that vary at the rate of a changing polarization. Such a large error can be detrimental to the tracking system accuracy and reliability and it is to the improvement in the directional accuracy of tracking and guiding systems that this invention is directed.

Figure 3:
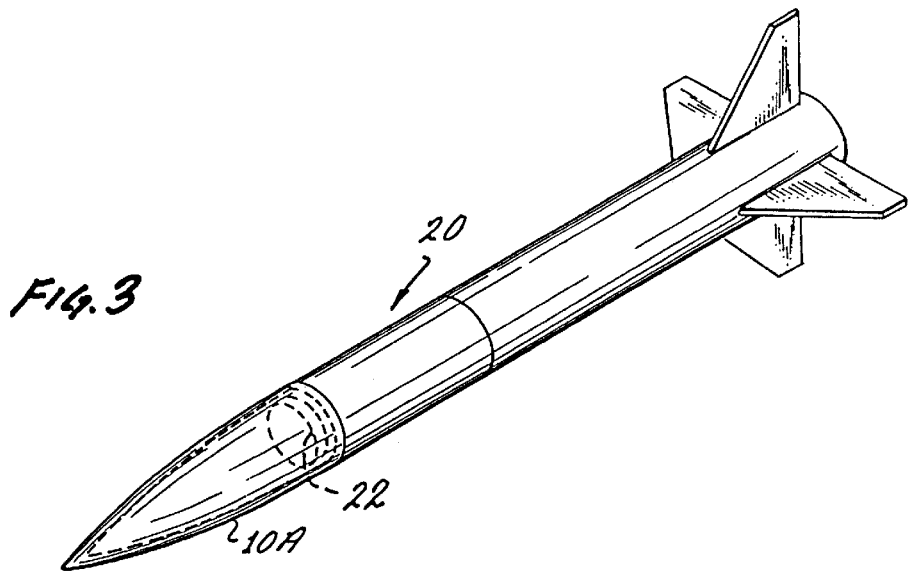
FIG. 3 illustrates a perspective view of a missile with a radome constructed in accordance with the teachings of this invention.

Also, FIG. 3 illustrates a typical missile 20 whose nose is defined by the streamlined radome 10A constructed in accordance with this invention which gives mechanical protection to the electronic and mechanical equipment disposed within the radome, such as antenna 22 for transmitting or receiving RF energy, and mounting devices for supporting the antenna and providing the oscillation or rotation thereof for the missile direction and guidance system. The mechanism for imparting movement to, and measuring the position of antenna 22 is carried within the antenna apparatus and is not shown or described herein since such apparatus and their construction are well known in the art and do not form a part of the applicant's invention As shown in FIG. 3, and enlarged for clarity in FIG. 6, the radome 10A which has crossplane polarization error corrected, has a taper formed in the radome wall thickness. The radome wall is thinnest at the base as at 26, in an area adjacent to the antenna itself, and gradually thickness to the thickest portion 28 at the tip 30. The thickness taper is determined according to the following formula.

$$D = \frac{n\lambda}{2\sqrt{\epsilon_R - \sin e^2 \theta}}$$

where

D=thickness of radome wall

λ=wavelength $\epsilon_R$=dielectric constant

θ=angle of incidence of RF energy impinging on the radome wall n=1,2,3, . . .

The foregoing thickness taper minimizes the insertion phase delay (IPD) caused by the radome which is a function of the operating frequency, the incidence angle, the electrical properties of the radome material (dielectric constant and loss tangent) and polarization of the plane wave incident on a radome. The incident angle of the RF energy impinging on the wall of a streamline radome (as shown in FIG. 1) is largest near the radome tip and minimum at the aft end of the radome. Thus, according to the foregoing formula, the largest thickness of a homogeneous material for minimum IPD should be near the tip where the largest incidence angle exists.

Figure 4A:
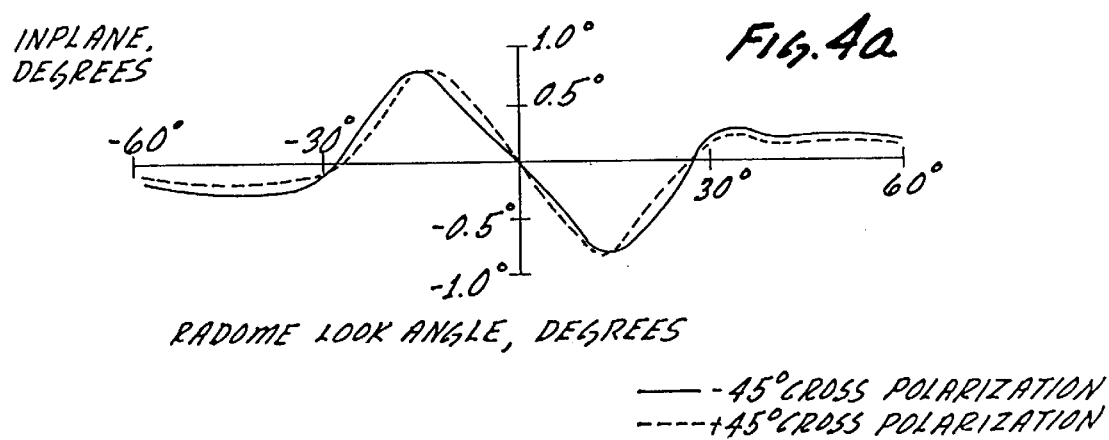
FIGS. 4a and 4b show the performance characteristics of a tapered wall radome as constructed according to teachings of this invention with FIG. 4a showing inplane error and FIG. 4b showing cross-plane error.
Figure 4B:
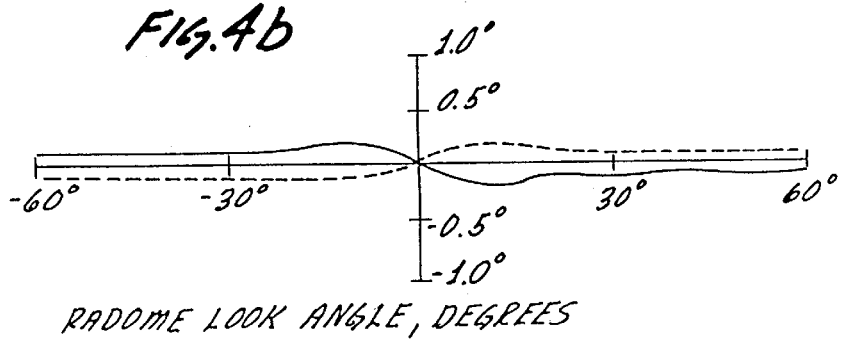

Turning now to FIGS. 4a and 4b where boresight error components are plotted against look angle, the boresight error performance with a radome wall thickness taper according to the invention, show that the crossplane component of the error has been reduced to a trivial case, i.e., considerably less than 0.50° while the inplane error has become larger, i.e., about 2.0° and the rate of change of the error (slope) has increased.

Thus, while crossplane error becomes nearly nonexistent, the inplane error on the other hand, while having increased, is periodic, parametric and predictable in its performance. Because of this, the use of digital electronic compensation for the inplane error can be accomplished.

The compensation procedure according to FIG. 5, is as follows:

1. A tapered design radome is electrically tested for boresight error.

This is accomplished by obtaining data on the tapered radome, either individually or by sample depending on requirements, by first testing the antenna 22 without the radome under circumstances by which a target T can be identified with the transmitted or received radar characteristics through several frequencies. This data represents the antenna position and frequency of transmitted/received energy and target information tracking data. Thereafter, the tapered radome 10A is placed over the antenna and the same tests are performed. The difference in data represents boresight error introduced into the system by the radome and is mostly inplane error with this radome. Suitable analog-to-digital converters such as 30 are used for the test data and comparators (not shown) are used to obtain the difference in data, i.e., radome boresight error.

2. The boresight error data of this radome is then stored in an appropriate device, such as a disk or tape; block 32 of FIG. 5.

3. The digitized data is averaged to determine the average inplane curves for sectors of the radome at the several operating frequencies.

4. This average inplane data is digitally formatted into a microprocessor 34, which is part of the electronics of the system in which the radome functions, to provide equal and opposite compensation sets of data.

(That is to say that the digitized information is stored in memory (PROM) at known adresses, so called look up tables, to be usable in the microprocessor and responsive to antenna position, tracking and frequency data, all in digitized format as addressable data for the PROM.)

The system antenna position information and frequency of operation are the system inputs required so that the appropriate set of compensation data can be applied to the received tracking data to correct the radome caused boresight error.

The microprocessor for this invention can be selected from any of the well known manufacturers and programming the PROM(s) is done using techniques well know to those skilled in the art.

Turning now to FIG. 6, there is disclosed the tapered radome 10A encompassing a rotatable antenna 22 with the known characteristics of the boresight induced error, mostly inplane error since cross-plane error is minimal. In this Figure it can be seen that the antenna position data developed by a suitable sensor within the antenna apparatus 22 is sent to an analog-to-digital encoder 36 which in turn is sent to the microprocessor compensator 34 as one of the values for the microprocessor compensator to process. The second information is the received target information or tracking data determined by the received signals from the antenna 22 and processed through an analog-to-digital encoder 38 and sent to the microprocessor compensator 34.

A third input to the microprocessor compensator is the digitized frequency data on line 40, that is data from a suitable frequency generator (not shown) which generated the frequency transmitted or received by antenna 22 and which is digitized and sent to the microprocessor compensator. Since the antenna position data and the tracking data are inputted into the microprocessor and since the microprocessor contains the boresight error induced by the tapered radome, the three digitized signals, frequency data, tracking data and position data are processed by the microprocessor to provide the vehicle directional system with the compensated tracking data in line 42, i.e., the data in which the boresight error induced by the radome has been significantly reduced thereby improving the directional accuracy of the tracking and guidance system for the airborne vehicle.

While the foregoing description of the invention was directed to an antenna that physically moved, the invention also applies to electronic scanning type antennas. The A/D converters will be replaced, of course, by another type of digital decoder keyed to the electronic feeding the RF energy for electronic scanning but otherwise the inventive concept herein described is the same.

What is claimed is:

1. A method for improving the directional accuracy of tracking and guidance systems be reducing radome boresight error comprising the steps of, providing a streamlined radome with a tapered wall which gradually increases in thickness from its base to its tip, electrically testing said tapered radome for boresight error, digitizing inplane and crossplane error data and storing said digitized data in a memory device, formatting a microprocessor with sets of data which are equal and opposite to the data stored in said memory device as boresight error compensation data, and providing system antenna position information and frequency of operation data in digitized form to the system tracking channel data to correct the radome caused boresight error.

2. An apparatus for improving the directional accuracy of a tracking and guidance system having an antenna equipped with a scanning mechanism including sensors to provide antenna position data and electronics for transmitting RF frequency signals to and receiving signals from said antenna as target tracking data, for changing the directional course of the system to a desired direction, the improvement comprising:

means for defining a tapered wall in a streamline radome which gradually increases in thickness from base to tip, said antenna being disposed within said radome for transmitting and receiving said signals through said radome, means for translating said antenna position data and said antenna tracking data into digital pulses, a microprocessor for receiving said digitized antenna position data and tracking data, means for transmitting digitized frequency data to said microprocessor whereby the microprocessor processes said digitized position data, tracking data, and frequency data into compensated tracking data eliminating boresight error caused by said radome.

3. The apparatus as claimed in claim 2 wherein said wall of said radome is tapered according to the following formula:

$$D = \frac{n\lambda}{2\sqrt{\epsilon_R - \sin e^2 \theta}}$$

where
D=thickness of radome wall
λ=wavelength
$\epsilon_R$=dielectric constant
θ=angle of incidence of RF energy impinging on the radome wall
n=1,2,3, . . .

4. A radome of dielectric material for an airborne vehicle having an antenna which impinges RF energy on said radome during transmission and recovery of said RF energy, comprising:

a streamline shaped dielectric material open at the base and closed at the tip, the wall material defining the radome being thinner at said base and gradually increasing in thickness to said tip as defined by the following formula:

$$D = \frac{n\lambda}{2\sqrt{\epsilon_R - \sin e^2 \theta}}$$

where
D=thickness of radome wall
λ=wavelength
R=dielectric constant
θ=angle of incidence of RF energy impinging on the radome wall
n=1,2,3, . . .

5. A tracking and guidance system having an antenna equipped with a scanning mechanism including sensors to provide antenna position data and electronics for transmitting and/or receiving RF signals as target tracking data for changing the course of a vehicle to a desired direction, the improvement for making the directional data more accurate, comprising:

a streamlined radome enclosing said antenna and through which said signals are transmitted and/or received, said streamlined radome having tapered walls which are thinnest at the base and thickest at the tip of said radome, means for translating said antenna position data and said target tracking data into digitized signals for delivery to said system, memory means for containing information regarding the boresight error characteristics of said radome, means for receiving the frequency at which said antenna is sending and/or receiving said signals, and means for defining the boresight error of said radome at the frequency and position at which said antenna is operating, and sending a compensated tracking signal to said tracking and guidance system.

* * * * *